(12) United States Patent
Hill et al.

(10) Patent No.: US 8,087,055 B2
(45) Date of Patent: Dec. 27, 2011

(54) APPARATUS, AND ASSOCIATED METHOD, FOR FACILITATING DISTRIBUTION OF RECORDED CONTENT

(75) Inventors: Mark C. Hill, Fort Worth, TX (US); David J Edmondson, Southlake, TX (US)

(73) Assignee: Radioshack Corporation, Fort Worth, TX (US)

( * ) Notice: Subject to any disclaimer, the term of this patent is extended or adjusted under 35 U.S.C. 154(b) by 1056 days.

(21) Appl. No.: 10/893,631

(22) Filed: Jul. 16, 2004

(65) Prior Publication Data

US 2005/0138141 A1 Jun. 23, 2005

Related U.S. Application Data

(60) Provisional application No. 60/527,070, filed on Dec. 4, 2003.

(51) Int. Cl.
*H04N 7/173* (2011.01)

(52) U.S. Cl. ............... 725/91; 725/86; 725/93; 725/114

(58) Field of Classification Search ............. 725/91, 725/93, 97, 114, 115, 116, 86
See application file for complete search history.

(56) References Cited

U.S. PATENT DOCUMENTS

| | | | |
|---|---|---|---|
| 2001/0053945 A1* | 12/2001 | Hayashi et al. | 700/94 |
| 2003/0028872 A1* | 2/2003 | Milovanovic et al. | 725/12 |
| 2003/0126237 A1* | 7/2003 | Tsuchiya | 709/220 |
| 2003/0225919 A1* | 12/2003 | Dengler | 709/310 |
| 2004/0019497 A1* | 1/2004 | Volk et al. | 705/1 |
| 2005/0108754 A1* | 5/2005 | Carhart et al. | 725/47 |

* cited by examiner

*Primary Examiner* — Kristine Kincaid
*Assistant Examiner* — John Schnurr

(57) ABSTRACT

Apparatus, and an associated method, for facilitating formation of content streams formed of content for distribution to content consumers. A request detector detects indications of demand for content. Selection of what content to be included in a content stream is based, in part, upon the demand for the content indicated by the request detector. Once selection of the content is made, the content streams are generated by retrieving the selected content. And, the content streams, once formed, are made available for distribution to the content consumers.

20 Claims, 2 Drawing Sheets

APPARATUS, AND ASSOCIATED METHOD, FOR FACILITATING DISTRIBUTION OF RECORDED CONTENT

CROSS-REFERENCE TO RELATED APPLICATIONS

The present invention claims the priority of Provisional Patent Application No. 60/527,070, filed on Dec. 4, 2003, the contents of which are incorporated herein by reference.

The present invention relates generally to the distribution of recorded content, such as musical, or other entertainment, content, to consumers of the content. More particularly, the present invention relates to apparatus, and an associated method, by which to select content files of recorded content to form content streams that are distributed to the content consumers.

The content files are selected responsive to indications of their demand, such as by monitoring consumer requests for the content. And, the content streams, once formed, are distributed to the content consumers by way of a distribution mechanism, e.g., a satellite radio communication system. The content is selected to be included in the content stream based upon quantitative demand indicia. Improved consumer acceptance of, and desire for, the content stream results as the contents of the content stream better matches consumer demand than conventional manners used by which to select the content.

BACKGROUND OF THE INVENTION

The entertainment industry is a large, and growing, area of commerce. Significant levels of revenue are generated as a result of demand by consumers for entertainment. Business entities associated with the entertainment industry sometimes are of national, or even international, scope and presence. Various business entities are associated with different segments of the entertainment industry, including, e.g., the creation, performance, recordation, and distribution of musical, as well as other entertainment, content. And, long-established, and well-entrenched, commercial channels are in place that extend between the creators and the consumers of the content.

While the existing channels provide for the delivery of the content to the content consumers, technological advancements in communication and processing technologies that have become available have not fully been implemented. Their implementation would increase the efficiencies of the distribution, both in timeliness and quality, as well as in other manners. And, to the extent that technological advancements have been implemented, their implementation has not been made in integrated manners, but, rather, have been limited to discrete aspects or portions of the commercial channels.

Advancements in digital, and other, communication technologies, for instance, have permitted the development and deployment of new types of communication systems that provide new manners by which to distribute the musical and other entertainment content. Most generally, a communication system provides for the communication of data between a set of communication stations. A content consumer, positioned in proximity to a communication station to which the content is deliverable, is provided with the content pursuant to operation of the communication system. The communication station at which the content is originated is referred to as the content source, and the communication station at which the content is delivered is referred to as the content destination. The content is communicated by way of a communication channel to the content destination and provided to the content consumer in human perceptible form. Various types of communication systems are used to provide the content to the consumer. Wireline communication systems, for instance, are available for use through which to deliver the content to a content consumer. In a wireline communication system, the communication channels upon which the content is communicated are defined upon wireline connections that extend between the content source and the content destination. And, in radio communication systems, the communication channels upon which the content is communicated are defined upon radio channels, formed upon portions of the electromagnetic spectrum. Both wireline communication systems and radio communication systems are sometimes together used to deliver content to a content consumer. That is to say, sometimes a portion of a communication path extending between the content source and the content destination is formed of a radio communication system.

Communications by way of a conventional telephonic system and by way of the Internet backbone are exemplary of wireline communication systems. And, satellite-based radio, television, and other broadcast, systems are also exemplary of radio communication systems that are used to communicate content. Content is deliverable to content consumers in a stream of successive content files forming a content stream by any of these communication systems. The content streams are broadcast to, or otherwise distributed to, the consumers.

While content, formed into a content stream, is deliverable to a content consumer by way of any of various different types of communication systems, including communication systems that take advantage of advancements in communication and processing technologies, existing schemes by which to select content that is broadcast to a content consumer fails fully to take advantage of advancements in communication technologies.

Selection is made, for instance, based upon pre-ordained "play lists", selected days, weeks, or even months prior to the broadcast of the content. Due to the time lag between the creation of the play list and the broadcast of the content, the content that is broadcast is not necessarily, and oftentimes is not, the content most-demanded by the content consumers. If a better manner could be provided by which to select which content is to be broadcast to content consumers by a selected communication system forming a distribution mechanism, the broadcast content could better be that which is desired by the content consumers.

It is in light of this background information related to the distribution of recorded content that the significant improvements of the present invention have evolved.

SUMMARY OF THE INVENTION

The present invention, accordingly, advantageously provides apparatus, and an associated method, for facilitating distribution of recorded content, such as musical or other entertainment content, to consumers of the content.

Through operation of an embodiment of the present invention, a manner is provided by which to select content files of recorded content to form content streams that are distributed to, or made available for distribution to, the content consumers.

Indications of demand for individual ones of the content files are ascertained. The indications are ascertained by monitoring of consumer requests for the content. By forming the content streams of content files that are associated with greatest levels of demand, and hence, popularity, the resultant content streams are correspondingly to be more greatly demanded by the content consumers.

The indications of the demand for the content files are quantitative indications and indicate current, or nearly current, demand for the content files. Reliance upon qualitative evaluations of the demand for the content files or reliance upon outdated demand indicia that might otherwise alter the selection of which content files are included in the content streams is obviated.

As a result, improved consumer acceptance of, and desire for, the content stream results. And the selection procedures and formation of the content stream responsive thereto are performable automatically, from a centralized location. Content-stream play lists are created and distributed quickly, without need for manual intervention or decision making.

In one aspect of the present invention, content selection and content stream formation is performed at a content depository and distribution facility. The content files of recorded music or other entertainment are uploaded, or otherwise provided, to the facility to be stored at a database maintained by the facility. The content files are, for instance, digital files, encoded pursuant to a conventional encoding scheme, such as .mpeg-encoded files. The database, formed of the content files, is embodied, for instance, at a computer server, or other mass-storage device, located at, or connected to, the facility.

The content depository and distribution facility is, for instance, separately operable to distribute individual content files, such as for purchase or other commercial transaction by which the requested content file is provided to, or made accessible to, the requesting consumer. The request by the content consumers for selected ones of the content files provides indications of the demand for the individual ones of the content files. Indications of the requests are further used at the content depository and distribution facility to identify which content files are in greatest demand and to select, in response thereto, the content files that are to form content streams that are generated at the facility. The content consumers that generate the requests for the individual content files are representative of a class of content consumers, but need not be the same content consumers to which the content streams, once formed, are provided.

In a further aspect of the present invention, when requests are made by the content consumers for the individual content files, the requests include indicia associated with the content consumers that request the content. The indicia includes, for instance, the geographical area in which the content consumer making the request is located, the age bracket of the content consumer, or other identification of a consumer-class to which the content consumer belongs. The consumer-category is further utilized to select the content files that are to be included in a particular data stream. Multiple data streams are formable, each data stream associated with a particular consumer category. The demand for individual content files is differentiated on a consumer-category basis. And, the content files selected to be included in a content stream is dependent upon indications of its demand by a certain category of content consumers.

In another aspect of the present invention, the content files stored and maintained at the database of the content depository and distribution facility is further indexed together with content identifiers. Selection of which content to include in a content stream is further responsive to the identification indicia associated with the content files. That is to say, content files are eligible for inclusion in particular content streams based upon the content identifiers that identify the content files. Thereby, only content that is identified to pertain to a particular category of content is includable in a particular content stream. Selection is thereby made both of demand for the content and upon the category to which the content belongs.

Once the content stream is formed, the content depository and distribution facility provides the content stream to a distribution mechanism, such as a satellite radio system, terrestrial radio system, or wireline communication system for the content stream to be distributed to consumers of the content. Consumer access to receive the content is permitted, e.g., pursuant to purchase of a subscription to receive the content stream during a selected time period.

The indications of the demand for particular content files is quantitative as the indications are based upon actual demand for the content. And, the indications of the demand are provided nearly immediately, thereby ensuring that the indications of the demand are timely. Selection of the content files to form a content stream is made automatically, without need for manual intervention, and the content stream, once formed, is provided to an appropriate distribution mechanism for distribution to consumers of the content. As the content stream is formed of content, selected based upon demand for the content, consumer acceptance of, and desire for, the content streams is enhanced.

In these and other aspects, therefore, apparatus, and an associated method, is provided for facilitating distribution of content to content consumers. The content is distributed as at least a first content stream formed of a first content file and at least a second content file. The content is storable at a content database. A demand detector is adapted to receive indications representative of demand for at least selected content files of the content. The demand detector detects the indications and identifies with which of the content files that the indications are associated. A content-stream selector is coupled to the demand detector to receive indications of identifications made by the demand detector. The content-stream selector selects which content files to include in, and thereby to form, the at least the first selected content stream. A content-stream generator is coupled to the content-stream selector and also to access the content storable at the content database. The content stream generator retrieves, from the content database, the content files selected by the content-stream selector and forms therefrom the at least the first content stream.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
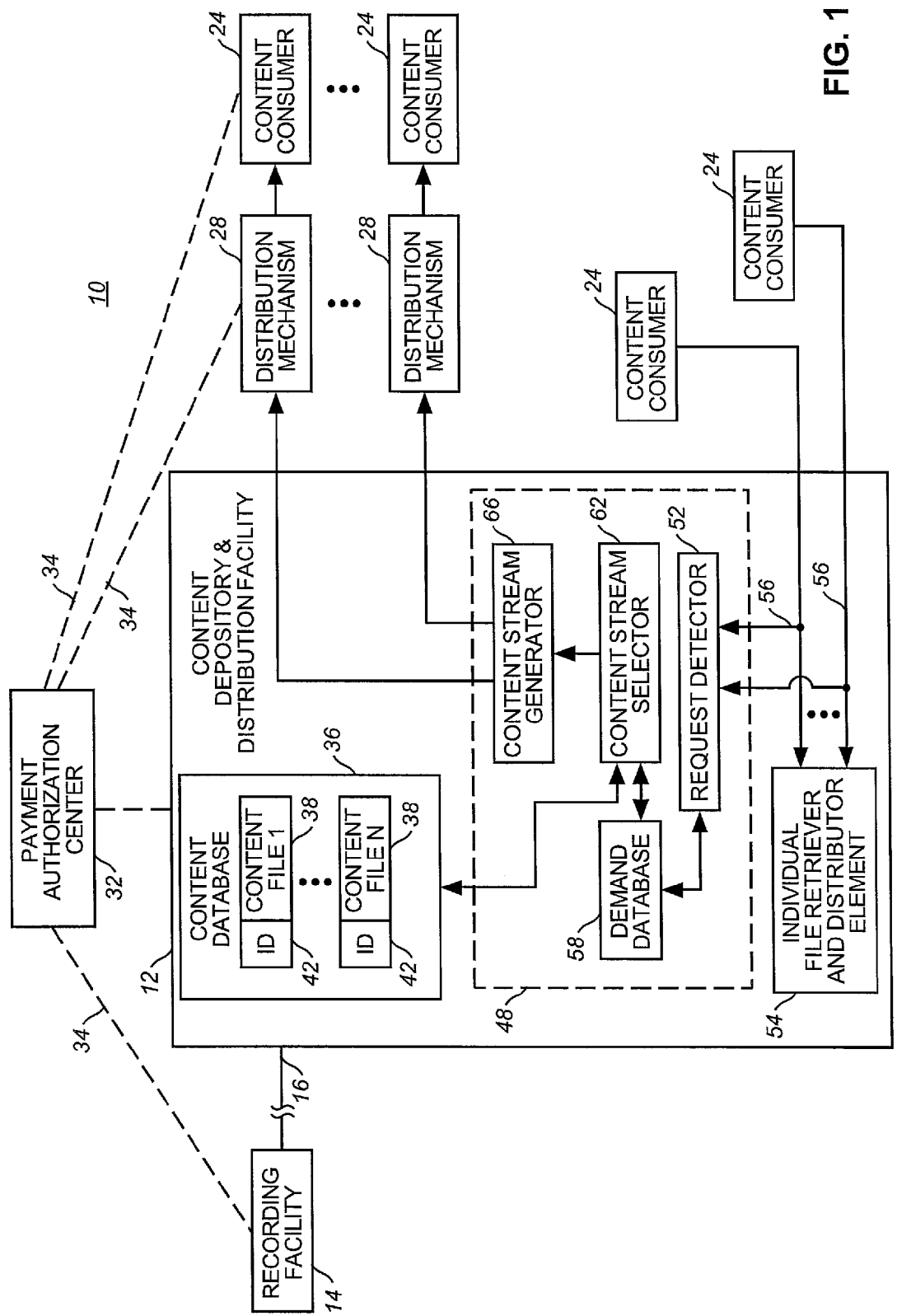
FIG. 1 illustrates a functional block diagram of a content-stream selection and generation apparatus embodied at a content depository and distribution facility of an embodiment of the present invention.

Referring first to FIG. 1, a content creation and distribution system 10 provides for the creation, maintenance, and distribution of musical, and other entertainment, content. In the exemplary implementation, various elements of the system 10 are embodied at spaced-apart locations, connected there together by way of appropriate communication connections. While the following description of exemplary operation of the system 10 shall be described with respect to its implementation corresponding to that shown in FIG. 1, the system, in alternate embodiments, is implemented in other manners, and operation of an embodiment of the present invention implemented therein is analogously operable and analogously described.

The system 10 includes a content depository and distribution facility 12. The content depository and distribution facility is maintained and operated by a facility operator. Recorded content is provided to the content depository and distribution facility, here, for instance, by a recording facility 14. Alternately, recorded content is provided to the facility 12 by other entities, not separately shown. And, alternately, live content is communicated to the facility 12 and recorded at the facility by appropriate recording apparatus. The recording facility 14 is positionable in communication connectivity with the facility 12, here represented by way of a communication path 16.

The content depository and distribution facility 12 operates to store and maintain the content provided thereto and selectably to cause distribution of the content maintained at the depository to content consumers, here represented by the content consumers 24. Communication connectivity between the facility 12 and the content consumers is provided by distribution mechanisms 28. The distribution mechanisms are representative of any available communication system through which to distribute content, such as a satellite radio communication system, a terrestrial radio communication system, or a wireline communication system.

A payment authorization center 32 also forms part of the content creation and distribution system 10. The payment authorization center is selectably placed in communication connectivity with any of the content depository and distribution facility 12, the recording facility 14, and the content consumers 24 by way of communication paths 34. The payment authorization center authorizes credit transactions or otherwise verifies creditworthiness of entities between which commercial transactions are made, such as when content consumers request content from the content depository and distribution facility.

The content depository and distribution facility 12 includes a content database 36 formed of a plurality of content files 38. The content files contain recorded content, such as recorded music and other entertainment content. Content identifiers 42 are associated with each of the content files. More than one content identifier can be associated with a content file. The content identifier identifies, in some manner, the content file with which the identifier is associated. The identifiers are formed, for instance, of record fields that identify the content file by its title, by a content category, content sub-category, etc. The content identifiers 42 are used during operation of an embodiment of the present invention by which to identify the content files and to identify eligibility of the content files for including content streams that are formed for distribution to content consumers.

The content depository and distribution facility further includes apparatus 48 of an embodiment of the present invention. The apparatus operates to select content maintained at the content database, or elsewhere, to form one or more content streams that are made available for distribution to content consumers. The apparatus operates automatically, without need of manual intervention to select the content and to form the content streams once the content has been selected. The apparatus is formed of functional entities, implementable in any desired manner, such as by algorithms executable by processing circuitry.

The apparatus includes a request detector 52 that operates to detect requests made by content consumers for distribution by individual ones of the content files 38 maintained at the content database. During separate operation of the system, consumers of content request that the content depository and distribution facility retrieve and send, by way of a distribution mechanism, requested content files. During this separate operation of the system, individual files are made available for purchase, or other distribution free of multiple distribution layers that previously had been required to deliver content to the content consumers. The other operation of the facility 10 is represented in functional block form by the element 54.

Indications of the requests, generated by the content consumers and provided to the element 54 are also provided to the detector 52, here by way of the lines 56. The lines 56 upon which the indications of the requests made by the content consumers are generated are monitored by the request detector, and, when the indications are detected by the detector, indications of the detections, together with indications of the requested content, and, in the exemplary implementation, also indications of the indicia associated with the content consumers making the requests are provided to a demand database 58. The demand database stores indications of the requests detected by the request detector that are representative of demand for individual ones of the content files. The demand database, in the exemplary implementation, stores values representative of the identity of the content files for which a request is made, content indicia associated with the content consumer making the request, and temporal indications, e.g., time and date, identifying when the request was detected. In one implementation, the database entry is deleted when the entry becomes dated, i.e., when the data is considered no longer to be timely.

The apparatus further includes a content-stream selector 62. The selector 62 is permitted access to the demand database 58 and also to the content database 36. The content stream selector operates to select files to be included in a content stream that is made available for streaming to selected content consumers. The content streams are, e.g., streams of successive content files that are playable or viewable by a user. The selector selects the content files to form a content stream responsive to a selection scheme. The selection scheme is here responsive, in part, to the indicated demand.

In one exemplary scheme by which the selector selects which content files to include in a content scheme, a first determination is made as to the rate at which content files are requested. The rates at which individual ones of the content files are requested must exceed a threshold to be includable in the content stream. And, in further implementations, the rate at which the requests are generated must exceed the threshold, or another threshold, for at least a selected time period to be eligible for inclusion in the content stream. And, in another implementation, to be includable in the content stream, the rate at which the content file is requested must be increasing at a rate of increase at least beyond a selected threshold. And, of course, combinations of these demand indications, as well as other demand indications, are selectable, as desired, to define the threshold demand levels.

In one implementation, the selector selects content files to be included in separate content streams, viz. more than one content stream. In this implementation, the requests indicating demand for specific content files are considered by certain requesters, i.e., content consumers, and not others, for different ones of the content streams. Alternately, or additionally, only content files exhibiting certain levels of demand or demand rate increases are considered for inclusion in a particular one of the content streams. Thereby, market segmentation of the content streams is attainable. When the consumer indicia associated with the content consumers that request content files includes an age indicator, e.g., a content stream is selectably formable based upon demand for content of consumers of a particular age bracket. And, e.g., when the identifiers associated with the content consumers identify the consumer by interest categories, the content stream is selectably formed of content files that are preferred by consumers having particular interests. Because the demand for particular content files is quantitatively indicated through detection by the request detector and stored at the demand database, the selection of content to be included in a content stream is based upon a quantitative indicia demand. And, because the detection, storage, and selection steps are all carried out automatically, manual intervention to select the content forming the content stream need not require manual intervention.

Selection made by the content-stream selector is further responsive, in the exemplary implementation, to content identifiers 42 associated with individual ones of the content files. The selector accesses the indications during the selection procedures. The content of the content file must be of a type, indicated by the identifier 42 associated therewith, eligible for inclusion in the content stream. For instance, if the content stream is to be formed of content files of a particular musical type, only content files that are of the particular musical type are eligible for inclusion into the content stream. The selector makes selection of the content files to form a content stream corresponding to the schemes just-described, but the content files that are eligible for consideration to form the content stream are limited to the subset of the content files that are of desired content types.

The content stream selector makes selection of the content files that are to form the one or more content streams, and indications of the selection are provided to a content stream generator 66. The generator 66 accesses the content database to retrieve the content file selected by the content-stream selector and to form the content streams therefrom. The content streams are provided directly, or buffered and then applied to, distribution mechanisms 28 for distribution to content consumers. The distribution of the content streams include content stream broadcasts that are delivered to a plurality of content consumers, if desired, or provided to individual ones of the content consumers.

Figure 2:
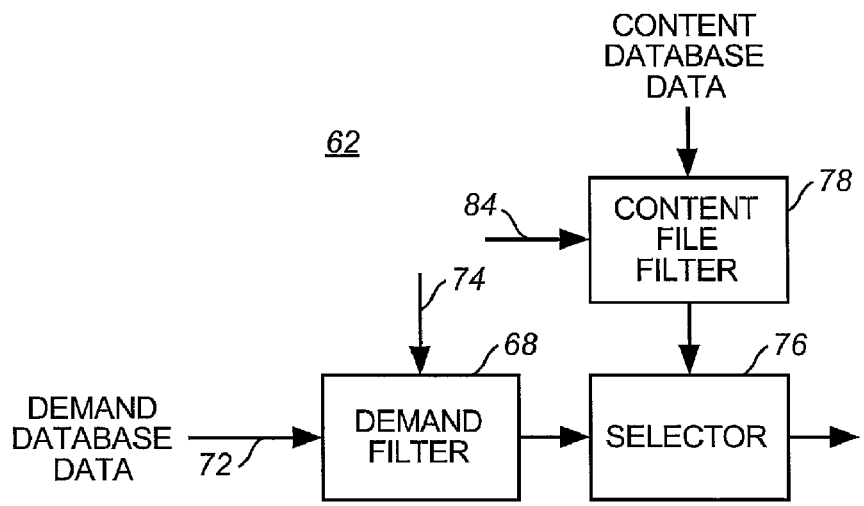
FIG. 2 illustrates a functional block diagram representative of an exemplary selector that selects the content to form a content stream generated pursuant to operation of an embodiment of the present invention.

FIG. 2 illustrates an exemplary representation of the content-stream selector 62 that forms part of the apparatus 48 (shown in FIG. 1) of an embodiment of the present invention. The elements of the selector are again represented functionally, implementable in any desired manner, including algorithms executable by processing circuitry.

The selector includes a demand filter 68 that accesses the demand database (shown in FIG. 1) and from which retrieved data is provided to the filter on the lines 72. The demand filter filters the data provided thereto on the lines 72 according to a filtering scheme, the constraints of which are provided to the filter screen by way of the line 74. Filtered data, such as a listing of content files that meet the filter constraints, are provided to a selector 76.

The content-stream selector also includes a content file filter 78 to which indications are provided on the line 82 from the content database 36 (shown in FIG. 1) of the identifiers associated with individual ones of the content files. And, the filter 78 is provided with filter constraints on the line 84. The filter operates to identify which content files meet the filter constraints and to provide indications of the content files that meet the constraints to the selector 76. Selection of the content files to form the content stream are selected at the selector.

Alteration of the filter constraints on the lines 74 and 84 are determinative of which of the content files are selected by the selector.

Figure 3:
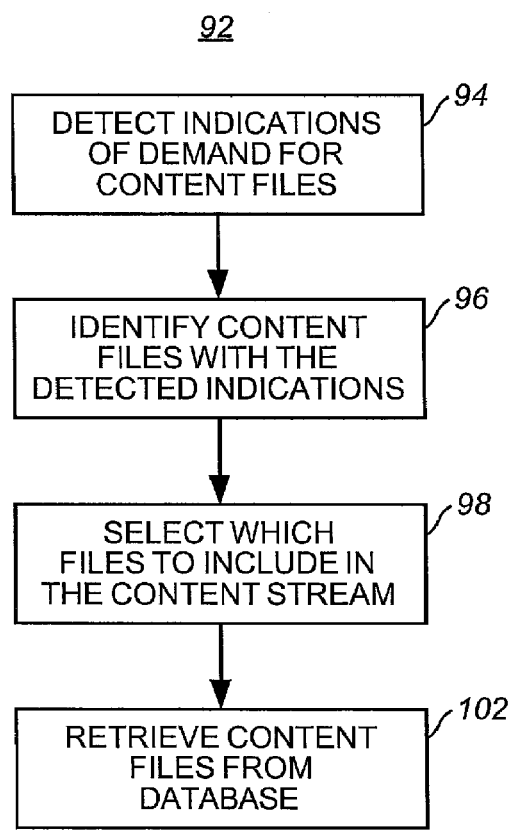
FIG. 3 illustrates a method flow diagram listing the method of operation of an embodiment of the present invention.

FIG. 3 illustrates a method flow diagram, shown generally at 92, representative of the method of operation of an embodiment of the present invention. The method facilitates distribution of content to content consumers. The content is distributed as at least a first content stream formed of a first content file and at least a second content file. The content is storable at a content database.

First, and as indicated by the block 94, indications representative of demand for at least selected content files of the content are detected. Then, and as indicated by the block 96, identification is made of with which of the content files that the indications are associated.

Selection is made, as indicated by the block 98, of which content files to include in, and thereby form, the at least the first selected content stream. And, as indicated by the block 102, the content files that are selected are retrieved from the content database, and the selected content stream is formed therefrom.

Because selection is based upon quantitative indications of demand for content and is nearly instantaneously accessible, decisions need not be made based merely upon qualitative evaluations of demand for content. And, because the procedures are carried out automatically, the need for manual intervention to select the content files that are included in the content stream, and then to form the content stream, need not utilize manual intervention.

The previous descriptions are of preferred examples for implementing the invention, and the scope of the invention should not necessarily be limited by this description. The scope of the present invention is defined by the following claims.

What is claimed is:

1. Apparatus for distributing a stream of recorded content to a first plurality of content consumers who receive streamed content files, comprising:
    a payment center that accepts payment for a requested content file for individual file content delivery by a first communication system for delivery to one content consumer of a second plurality of content consumers, who request and purchase individual content files;
    a detector, independent of individual file content delivery, that detects said request for delivery of said requested content file;
    a demand database coupled to said detector and configured to store an identity of said requested content file of said detected delivery request;
    a content stream selector that selects said requested content file additionally for inclusion in a content stream of successive content files, each content file of which having been requested for purchase by individual consumers of said second plurality of content consumers, said selection based on at least said identity of said requested content file of said detected request having been stored in said demand database;
    a content stream generator that forms said content stream in response to said selection by said content stream selector; and
    a second communication system through which said generated streamed content is delivered, separably operable from said first communication system, to the first plurality of content consumers who have subscribed for delivery of said generated streamed content.

2. The apparatus of 1 wherein said demand database further stores indicia indicative of a content category of said requested content file.

3. The apparatus of 1 wherein said demand database further stores indicia indicative of a geographical area in which said at least one consumer of said second plurality of content consumers is located.

4. The apparatus of 1 wherein said demand database further stores indicia indicative of an age bracket for said at least one consumer of said second plurality of content consumers.

5. The apparatus of 1 wherein said demand database further stores indicia indicative of a consumer class for said at least one consumer of said second plurality of content consumers.

6. The apparatus of 1 wherein said content stream generator further comprises the forming of said content stream in response to at least one of a content category of said requested content file, a geographical area in which said at least one consumer of said second plurality of content consumers is located, an age bracket for said at least one consumer of said second plurality of content consumers, and a consumer class for said at least one consumer of said second plurality of content consumers.

7. The apparatus of claim 6 wherein said content stream generator further comprises the forming of at least two content streams, each content stream based on a different one of a content category of said requested content file, a geographical area in which said at least one consumer of said second plurality of content consumers is located, an age bracket for said at least one consumer of said second plurality of content consumers, and a consumer class for said at least one consumer of said second plurality of content consumers.

8. The apparatus of 1 wherein said payment center accepts payment for said requested content file for individual delivery to each of a plurality of consumers of said second plurality of content consumers, said detector detecting said requests for delivery of said requested content file, and said demand database storing the identity of said requested content file of said detected requests.

9. The apparatus of 8 wherein said content stream selector that selects said requested content file for inclusion in a content stream further comprises a rate determiner that determines a rate at which said requests for delivery of said requested content file are detected.

10. The apparatus of claim 9 said rate determiner for said content stream selector further comprises a rate determiner that determines when said rate exceeds a selected threshold rate.

11. A method for distributing a stream of recorded content to a first plurality of content consumers who receive streamed content files, comprising:
    accepting payment for a requested content file for individual content file delivery by a first communication system for delivery to one consumer of a second plurality of content consumers, who request and purchase individual content files;
    detecting said request for delivery of said requested content file, independent of individual file content delivery;
    storing an identity of said requested content file of said detected delivery request in a demand database;
    selecting a plurality of content consumers as members of the first plurality of content consumers;
    selecting said requested content file additionally for inclusion in a content stream of successive content files, each content file of which having been requested for purchase by individual consumers of said second plurality of content consumers, said selection based on at least said identity of said requested content file of said detected request having been stored in said demand database;
    generating said content stream in response to said selection of said requested content; and
    streaming said generated content stream to the first plurality of content consumers who have subscribed for delivery of said generated streamed content via a second communication system through which content is delivered, said second communication system being separably operable from said first communication system.

12. The method of 11 further comprising the operation of generating indicia indicative of a content category of said requested content file.

13. The method of 11 further comprising the operation of generating indicia indicative of a geographical area in which said at least one consumer of said second plurality of content consumers is located.

14. The method of 11 further comprising the operation of generating indicia indicative of an age bracket for said at least one consumer of said second plurality of content consumers.

15. The method of 11 further comprising the operation of generating indicia indicative of a consumer class for said at least one consumer of said second plurality of content consumers.

16. The method of 11 wherein said selecting said requested content file for inclusion in said content stream is further based on at least one of content category of said requested content file, geographical area in which said at least one consumer of said second plurality of content consumers is located, an age bracket for said at least one consumer of said second plurality of content consumers, and a consumer class for said at least one consumer of said second plurality of content consumers.

17. The method of claim 16 wherein said selecting said requested content file for inclusion in said content stream further comprises the operation of generating at least two content streams, each content stream based on a different one of content category of said requested content file, geographical area in which said at least one consumer of said second plurality of content consumers is located, an age bracket for said at least one consumer of said second plurality of content consumers, and a consumer class for said at least one consumer of said second plurality of content consumers.

18. The method of 11 wherein said operation of accepting payment further comprises accepting payment for said requested content file for individual delivery by said first distribution mechanism to each of said plurality of consumers of said second plurality of content consumers, detecting said requests for delivery of said requested content file, and storing said detected requests in said demand database.

19. The method of 18 wherein said selecting of said requested content file for inclusion in a content stream further comprises determining a rate at which said requests for delivery of said requested content file are detected.

20. The method of claim 19 wherein said selecting of said requested content file for inclusion in a content stream further comprises determining when said rate exceeds a selected threshold rate.

* * * * *